May 8, 1928.
L. J. D. HEALY
HOSE
Filed April 9, 1924
1,668,560
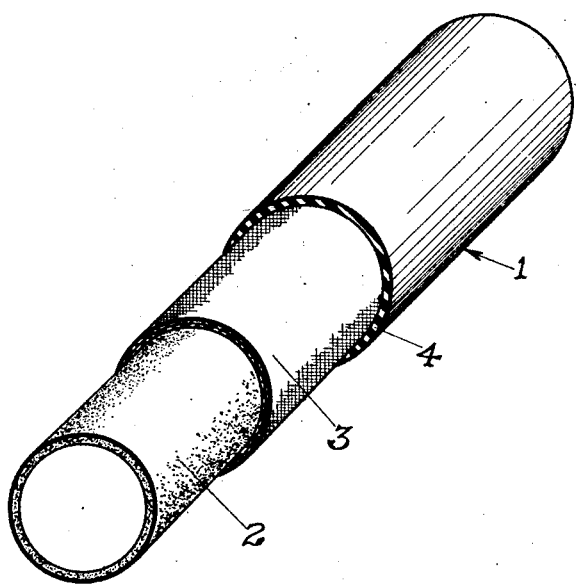
LEON J. D. HEALY
INVENTOR
BY *Robert P. Harney*
ATTORNEY Patented May 8, 1928.

1,668,560

UNITED STATES PATENT OFFICE.

LEON J. D. HEALY, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

HOSE.

Application filed April 9, 1924. Serial No. 705,264.

My invention relates to the manufacture of hose and more particularly to that type of rubber and fabric hose which is required to withstand collapsing pressure.

I am aware that it has been proposed to insert a spiral metal re-enforcement in the body of the hose to stiffen it and give it the desired rigidity. This procedure however is costly and the metal element has a tendency to become loosened. It is the object of my invention to provide a hose construction which shall be sufficiently rigid to withstand collapsing pressure, such as is caused by the atmosphere when a partial vacuum is created in the hose, and which shall be free from metal elements.

In the accompanying drawings which illustrate one embodiment of my invention the single figure represents a perspective view of a section of hose.

The hose generally indicated at 1 comprises an inner member 2 formed of fiberized rubber, that is a rubber compound containing a substantial amount of relatively fine fibrous material milled or otherwise mixed into the rubber so that the fibers are thoroughly and equally dispersed in the rubber in all directions. This material is stiff and tough, the fibre acting as a re-enforcement in all directions and the rubber component itself is preferably a hard or semi-hard grade of rubber. This material is tubed to the desired size and shape and is then convolutely wound with a number of plies of fabric 3 previously coated with a stiff rubber stock. An outer covering of high grade gum rubber 4 is then applied to form the outer surface. The hose as constructed may be cured in any conventional manner as by wrapping with fabric and vulcanizing in steam.

The hose thus produced is simple in construction, stiff and rigid to withstand collapsing pressure and without tendency of the elements to separate since the fabric and fibre re-enforcement bond strongly with the rubber.

I claim:

1. A hose comprising a body portion formed of fiberized rubber, and a plurality of plies of stiff rubber coated fabric wound thereon.

2. A hose comprising a body portion formed of fiberized rubber, a plurality of plies of stiff rubber coated fabric wound thereon and an outer layer of relatively soft rubber.

3. A hose comprising a body portion formed of stiff fiberized rubber, a plurality of plies of stiff rubber coated fabric wound thereon and an outer layer of relatively soft rubber.

In testimony whereof I have signed my name to the above specification.

LEON J. D. HEALY.